United States Patent [19]

Klemen et al.

[11] Patent Number: 5,000,300

[45] Date of Patent: Mar. 19, 1991

[54] HYDRAULIC RETARDER AND CONTROL

[75] Inventors: Donald Klemen, Carmel; Dennis M. Cooke, Danville; John R. Bitner, Arlington; J. Thomas Craig, Indianapolis, all of Ind.

[73] Assignee: General Motors Corporation, Detroit, Mich.

[21] Appl. No.: 435,916

[22] Filed: Nov. 13, 1989

[51] Int. Cl.⁵ ............................................. F16D 57/06
[52] U.S. Cl. ................................... 188/294; 192/4 B
[58] Field of Search ....................... 188/290, 294, 296; 192/4 B, 12 A, 12 C, 13 A

[56] References Cited

U.S. PATENT DOCUMENTS

| | | | |
|---|---|---|---|
| 3,987,874 | 10/1976 | Fuehrer et al. | 188/296 |
| 4,715,481 | 12/1987 | Brosius | 188/294 X |
| 4,881,625 | 11/1989 | Redelman | 192/4 B X |

FOREIGN PATENT DOCUMENTS 2016711  9/1979  Fed. Rep. of Germany ...... 188/294

Primary Examiner—Duane A. Reger
Attorney, Agent, or Firm—Donald F. Scherer

[57] ABSTRACT

A hydraulic retarder and control composed of an accumulator, for rapid filling of the retarder; a pulse valve, for controlling fluid flow to and from the accumulator; a regulator valve, for limiting the inlet pressure to the retarder; and a pair of check valves, for preventing fluid flow from the retarder to a pressure source and from the retarder to the accumulator. The pulse valve is controllable to provide rapid filling of the retarder, while the regulator valve will direct fluid from a secondary source to the retarder and control the pressure at the retarder inlet. The accumulator is filled from the main pressure source, between retard requests, at a rate that does not disturb the main transmission pressure level. One of the check valves and the pulse valve prevent the fluid in the accumulator from returning to the system other than when a retard request is present.

6 Claims, 3 Drawing Sheets

HYDRAULIC RETARDER AND CONTROL

BACKGROUND OF THE INVENTION

This invention relates to hydraulic retarders and controls therefore, and more particularly, to controls for filling an accumulator while the retarder is operative or inoperative, for preventing fluid reduction in the accumulator between retard requests, and for limiting the inlet pressure at the retarder.

The prior art hydraulic retarder and control mechanisms utilize an accumulator and a friction device simultaneously. The friction device initiates retardation, thereby compensating for the fill time required to dump the accumulator to the retarder. These devices permit uncontrolled fluid flow from the accumulator to the retarder, and therefore, substantially empty the accumulator with each retard operation, thereby requiring that the accumulator be completely refilled between retard operations. As a general rule, to accommodate the accumulator dumping and filling process, the displacement of the control pump for the transmission is increased.

As an alternative, retarder systems have employed a secondary pump, generally driven by the transmission output to provide pressure for the retarder and refilling of the accumulator. The secondary pump is usually in continuous flow with the retarder during the retarding operation. In either event, the requirement of increased oil supply from the control pump reduces the overall efficiency of the transmission. Also, due to the time lag between retard request and retard operation, a friction device is necessary for complete retarder control. This, of course, adds to the overall cost and complexity of the hydraulic retarder.

SUMMARY OF THE INVENTION

The retarder and control of the present invention provide a faster response to an operator request for filling the retarder and reduces the need for additional friction retardation. The control substantially eliminates the need for fluid flow directly from the transmission system pump during retarder fill. This permits the use of a control pump of less displacement which reduces the parasitic losses in the transmission so that an increase in overall efficiency of the transmission is attained.

It is an object of this invention to provide an improved control mechanism for a hydraulic retarder, wherein an accumulator is in communication with a pulse valve which controls rapid filling of the retarder and a regulator valve which is controllable to limit the inlet pressure and flow to the retarder and further wherein, a pair of check valves are operatively connected with the pulse valve to prevent back flow to the pressure source from the accumulator and back flow to the accumulator from the retarder.

It is another object of this invention to provide an improved hydraulic retarder and control, wherein an accumulator is charged from a pressure source through a check valve and an accumulator pulse valve and further wherein, fluid is selectively delivered to the retarder from the accumulator through the accumulator pulse valve and another check valve and also wherein, the inlet pressure to the retarder is controlled by a pressure regulator valve.

DESCRIPTION OF EXEMPLARY EMBODIMENTS OF THE INVENTION

Figure 1:
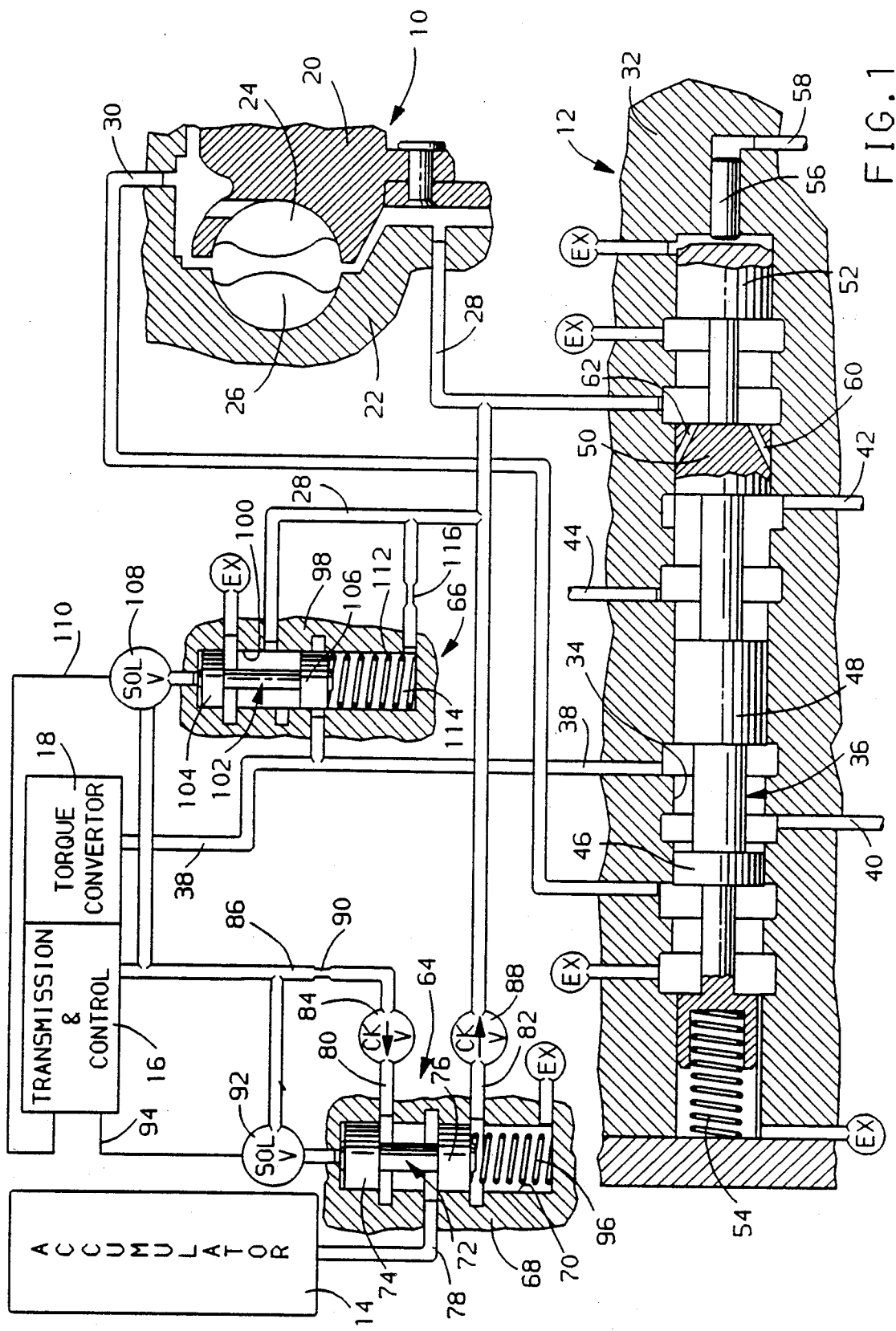
FIG. 1 is a diagrammatic representation of a retarder and control incorporating one embodiment of the present invention.
Figure 2:
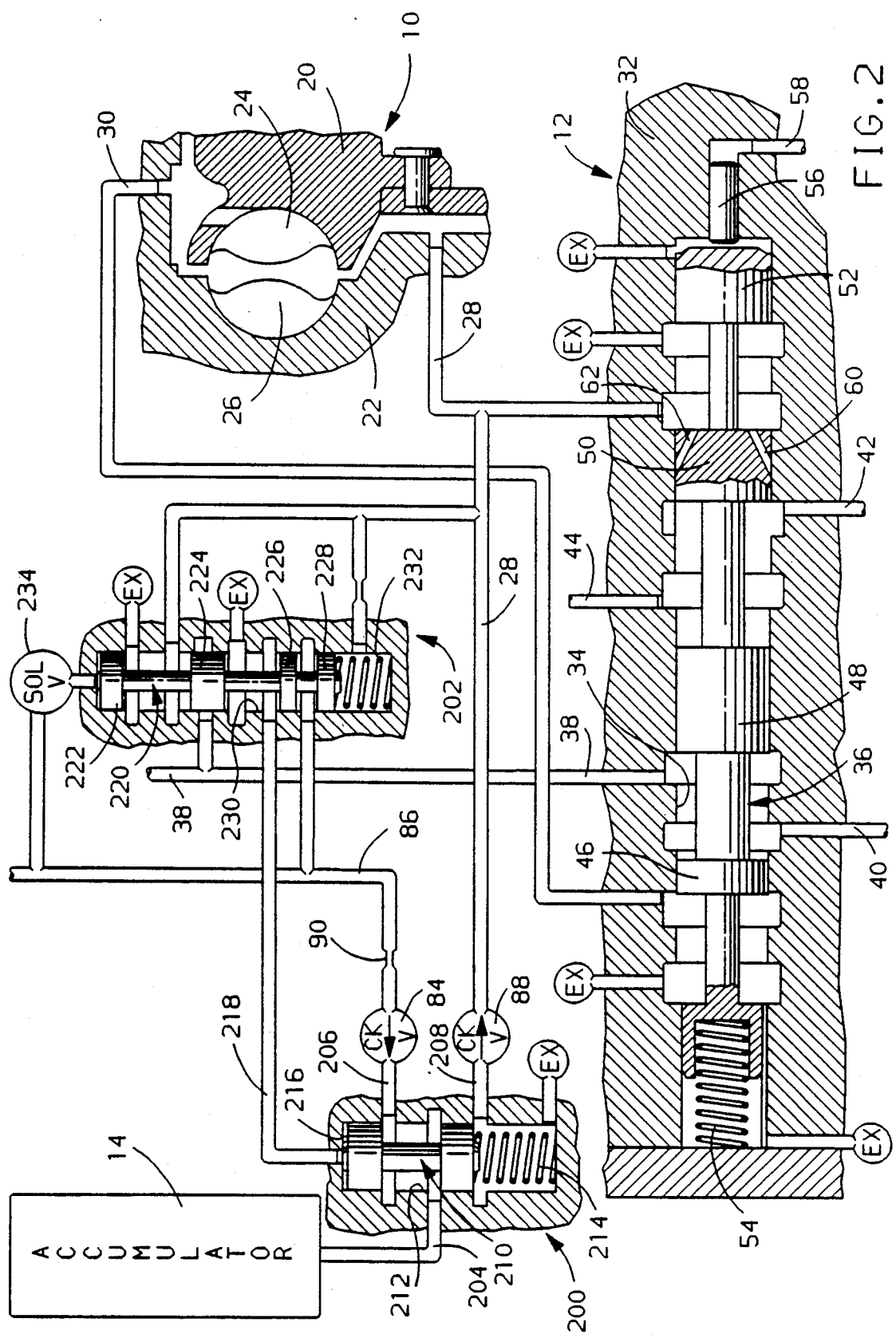
FIG. 2 is a diagrammatic representation of a retarder and control incorporating another embodiment of the present invention.
Figure 3:
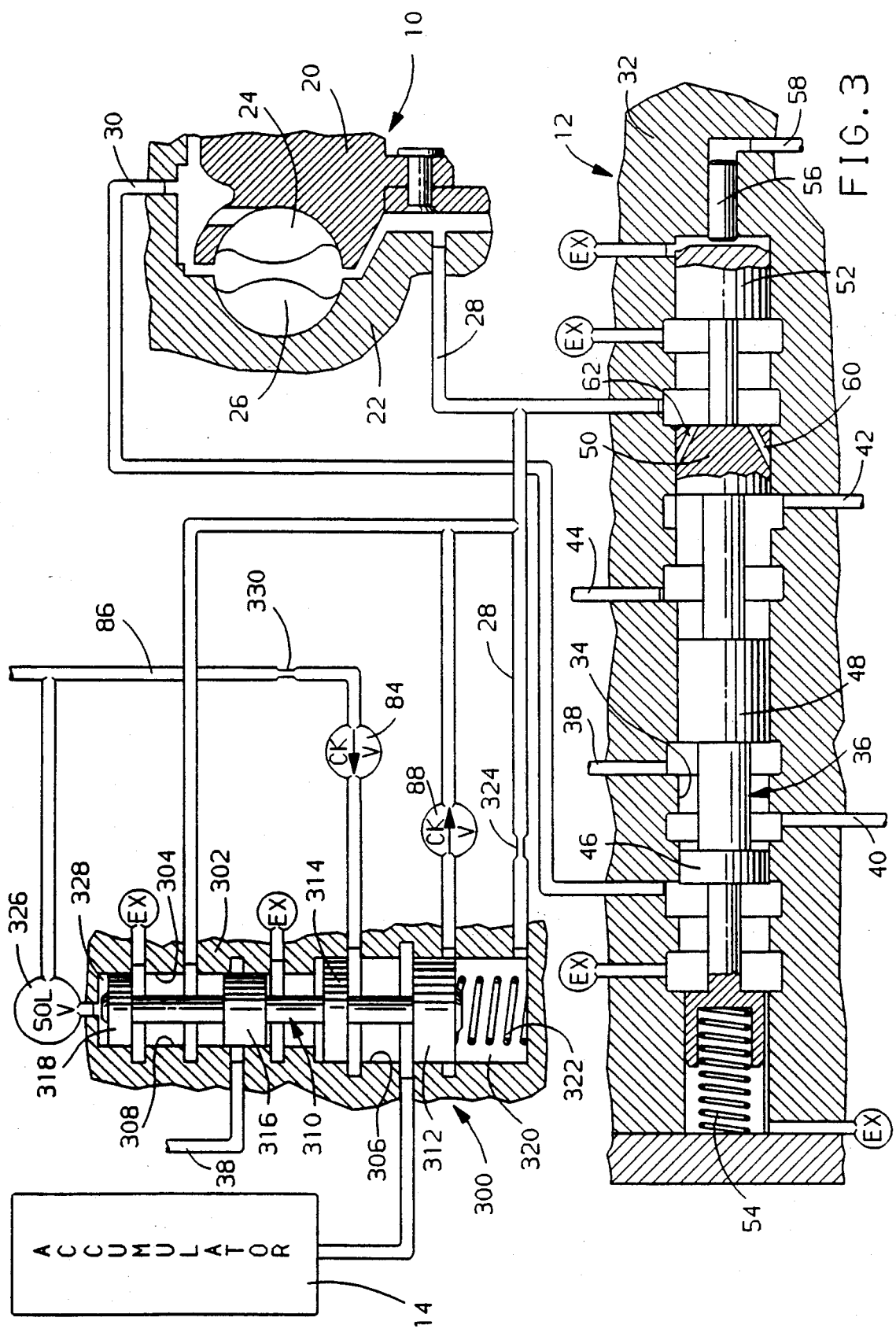
FIG. 3 is a diagrammatic representation of a retarder and control incorporating another embodiment of the present invention.

Referring to the drawings, wherein like characters represent the same or corresponding parts throughout the several views, there is seen in FIGS. 1, 2 and 3, a control mechanism and a hydraulic retarder depicted in diagrammatic form. Each of the mechanisms includes a hydraulic retarder, generally designated 10, a flow control valve, generally designated 12, an accumulator 14, and as seen in FIG. 1, a transmission and control 16 and a torque converter 18. The hydraulic retarder 10, flow control valve 12, accumulator 14, transmission and control 16 and torque converter 18 are conventional devices and the structure and operation will be well known to those familiar with the power transmission art. These devices include a conventional pump assembly providing a source of pressurized fluid which is used to operate the various devices in the transmission in a well known manner.

The block representation of the transmission 16 and torque converter 18 have been omitted in FIGS. 2 and 3, since their incorporation is not believed necessary for an understanding of the present invention.

Referring in particular to FIG. 1, the hydraulic retarder 10 is comprised of a rotor 20 drivingly connected to a rotating member of the transmission and control 16 and a stator portion 22 which is connected to a portion of either the power transmission or the vehicle (not shown) in a stationary manner. The rotor 20 and stator 22 have respective vane members 24 and 26 which undergo relative rotation and cause a churning of fluid within the toroid chamber formed in the rotor 20 and stator 22. When vehicle retarding is desired, a retarder inlet passage 28 is filled with fluid and delivered at the inner radius between the vanes 24 and 26. Fluid is directed from the retarder 10 through a retarder outlet passage 30.

The flow control valve 12 is comprised of a valve body 32 having formed therein, a bore 34 in which is slidably disposed a valve spool 36. The valve bore 34 is in fluid communication with a plurality of passages, including the retarder inlet passage 28, the retarder outlet passage 30, a converter outlet passage 38, a cooler inlet passage 40, a cooler outlet passage 42, a transmission lube passage 44 and a plurality of exhaust passages.

The valve spool 36 has a plurality of equal diameter valve lands 46, 48, 50 and 52. These valve lands cooperate with the valve bore 34 to establish the direction of fluid flow between the various connecting passages. The valve spool 36 is positioned within the valve bore 34 through the operation of a compression spring 54 and a control plug 56, which is responsive to pressure in a brake signal passage 58. The spring 54 urges the valve spool 36 to the spring set position shown in the bore 34. Fluid pressure in passage 58 operates on the control plug 56 such that at a predetermined pressure level, the plug 56 will have sufficient force to move the valve spool 36 against the spring 54 to thereby alter the fluid flow paths through the valve 12.

In the spring set position, both the retarder inlet passage 28 and retarder outlet passage 30 are connected to exhaust and therefore the retarder is inoperative. The converter outlet passage 38 is directed to the cooler inlet passage 40 while the cooler outlet passage 42 is connected to the lube passage 44. In the leftward or pressure set position of the valve spool 36 which is controlled by the plug 56, the retarder outlet passage 30 is in fluid communication with the cooler inlet passage 40 and the cooler outlet passage 42 is in communication with the retarder inlet passage 28. The torque converter outlet passage 38 will be closed at the valve 12 and the lube passage 44 will receive some fluid from the cooler outlet passage 42 through a pair of flow restriction passages 60 and 62.

The retarder control also includes an accumulator pulse valve 64 and a regulator valve 66. The pulse valve 64 is operative to control fluid flow to and from the accumulator 14 and is comprised of a valve body 68 having a single diameter valve bore 70 in which is slidably disposed a valve spool 72 having spaced equal diameter lands 74 and 76. The valve bore 70 is in fluid communication with an accumulator fill passage 78, a main pressure inlet passage 80 and a retarder fill passage 82.

The passage 80 is connected downstream of a conventional check valve 84, which in turn is in fluid communication with a main pressure passage 86 of the transmission and control 16. The passage 82 is in fluid communication with a check valve 88, which in turn is connected with the retarder inlet passage 28. The check valve 84 is disposed to direct fluid from the main passage 86 through a restriction 90 to the valve 64. The check valve 84 does not permit flow in the opposite direction. The check valve 88 is disposed to permit fluid flow from the passage 82 to the passage 28 and does not permit flow in the reverse direction.

The accumulator pulse valve 64 is preferably of solenoid control valving and to that end has a conventional solenoid control valve 92 which includes an electrical connection via wire 94 with the transmission and control 16. The solenoid valve 92 is also connected with the main pressure passage 86 such that fluid pressure can be introduced against one end of land 74 to control movement of the valve spool 72 against a spring 96.

In the spring set position shown, the accumulator pulse valve 64 is positioned to direct fluid from the main passage 86 to the accumulator 14. The fluid from main passage 86 will flow to the accumulator 14 only when the pressure in passage 80 is less than the pressure in passage 86 and the check valve 84 will prevent fluid under pressure from flowing in the reverse direction. Thus, if the accumulator 14 is not completely filled and the system pressure in passage 86 should momentarily decrease, for example, during a ratio interchange in the transmission, the accumulator 14 will not be depleted of fluid and likewise the transmission will have priority for the pressure fluid within the passage 86.

The solenoid 92 is energized whenever a retarder signal is generated by the operator. When the retarder signal is generated, the solenoid valve 92 will be operable to admit fluid pressure against valve land 74 thereby moving the valve spool 72 against the spring 96. With this movement, the passage 78 will be disposed in fluid connection with the passage 82 and through the check valve 88 with the passage 28. Thus, the control 16, accumulator 14 and the connecting passages provide a primary source of pressurized fluid for use with the retarder 10.

Since the flow valve 12 will also have responded to a retarder signal, the passage 28 will be disconnected from exhaust and closed to the valve 12 by the land 50. Under this condition, the retarder 10 will receive pressurized fluid in a very short period of time and retardation will commence.

The regulator valve 66 includes a valve body 98 in which is formed a valve bore 100. A valve spool 102 having spaced lands 104, 106 slidably disposed in the valve bore 100 and is operable to control fluid flow between the converter outlet passage 38 and the retarder inlet passage 28. The valve spool 102 is operative in the position shown to connect the passage 28 to exhaust. The regulator valve 66 is preferably a solenoid controlled valve and includes a solenoid valve 108 which is electrically connected by a wire 110 with the transmission and control 16. The solenoid valve 108 is in fluid communication with the main passage 86 such that during operation of the solenoid valve 108, fluid pressure can be directed to the valve land 104 thereby causing the valve spool 102 to be moved against a control spring 112.

The control spring 112 is disposed in a chamber 114 which is in fluid communication through restriction 116 with the retarder inlet passage 28. Therefore, pressure in the retarder inlet passage 28 will be operable to oppose fluid pressure established by the solenoid valve 108. The solenoid 108 is preferably a pulse-width-modulated type solenoid which will permit a variable control pressure to be imposed on the valve land 104. The solenoid 92 is preferably an on/off type solenoid.

During a retard request, the solenoid valve 108 will respond to the level of retardation requested by the operator to impose a predetermined pressure of the valve land 104 which will cause movement of the valve spool 102. When this movement occurs, the fluid pressure in the converter outlet passage 38 will be connected to the retarder inlet passage 28. Thus providing a secondary source of pressurized fluid for use by the retarder 10. The pressure in passage 28 will operate in the chamber 114 to limit the flow of fluid from passage 38 to passage 28. At this point, the retarder inlet pressure has been satisfied such that the solenoid valve 92 is deactivated and the accumulator will no longer be called upon to supply fluid to the retarder 10. From this instance, the retarder inlet fluid flow will be controlled by the solenoid valve 108 and the regulator valve 66. The retarder fluid is supplied by the torque converter outlet passage 38 and therefore does not impose any additional flow requirements on the system pump.

The control system seen in FIG. 2 is similar to that described in FIG. 1, and includes the retarder 10, flow control valve 12 and accumulator 14. The control of FIG. 2 also includes an accumulator pulse valve 200 and a regulator valve 202. The pulse valve 200 is connected to the accumulator 14 through a passage 204 and also to passages 206 and 208. Passage 206 is adapted to receive fluid from the main passage 86 through the restriction 90 and check valve 84. The passage 208 is adapted to deliver fluid through the check valve 88 to the retarder inlet passage 28. The accumulator pulse valve 200 includes a valve spool 210 which is slidably disposed in a bore 212 and under the control of a spring 214, in a pressure chamber 216, is operative to control fluid communication between passages 206 and 204 or between passage 208 and 204. The main difference between the valve 200 and the valve 64 is that a solenoid control valve is not used with the valve 200.

The chamber 216 is adapted to receive fluid pressure through a control passage 218 which is in fluid communication with the regulator valve 202. The regulator valve 202 includes a valve spool 220 having equal diameter spaced lands 222, 224, 226 and 228 slidably disposed in a valve bore 230, and positioned therein under the control of a spring 232 and a solenoid control valve 234. The solenoid control valve 234 is similar to the valve 108 and is adapted to be controlled in its operation by the transmission and control 16.

In the spring set position shown, the regulator valve 202 is operative to exhaust the passage 218 and close the converter outlet passage 38. In the pressure set position as established by the solenoid valve 234, the regulator valve 202 is effective to direct system pressure in passage 86 to the control passage 218 and also to establish a control pressure and flow from the torque converter outlet passage 38 to the retarder inlet passage 28.

When the regulator valve 202 reaches the pressure regulation point, the main passage 86 is disconnected from the control passage 218, such that the pulse valve 200 will return to the spring set position, such that further depletion of fluid from the accumulator 14 will not occur and, in fact, if system pressure in passage 86 is sufficient, the accumulator 14 will be refilled.

The control system shown in FIG. 3 also incorporates the retarder 10, flow valve 12 and accumulator 14. This control system, however, incorporates both the regulator and pulse accumulator valve in a single valve structure 300. This valve 300 includes a valve body 302 in which is formed a large diameter bore portion 306 and a small diameter bore portion 308. A valve spool 310 has a pair of spaced large diameter lands 312 and 314 slidably disposed in the large bore 306 and smaller diameter spaced lands 316 and 318 slidably disposed in the small diameter bore portion 308. The valve land 312 cooperates with the large diameter bore portion 306 to form a control chamber 320 in which is disposed a control sprinq 322. The control chamber 320 is in fluid communication through a restriction 324 with the retarder inlet passage 28.

The valve 300 has a solenoid control valve 326 which is operable to control fluid pressure in a chamber 328 disposed adjacent the land 318. The solenoid valve 326 is controlled in a well known manner by the transmission and control 16 to thereby control pressure in the chamber 328.

In the spring set position shown, the accumulator 14 is in fluid communication through a restriction 330 and the check valve 84 with the main passage 86, whereby the accumulator 14 can be pressurized. As with the control systems previously discussed, the check valve 84 prevents reverse flow from the accumulator.

When retardation is requested by the operator, the solenoid valve 326 will be operated to control the fluid pressure in chamber 328, such that the valve spool 310 will be moved against the spring 322 thereby closing the passage 86 to the accumulator 14, while opening the accumulator 14 through the check valve 88 with the retarder inlet passage 28. Simultaneously, the valve spool 310 will also provide fluid communication between the torque converter outlet passage 38 and the retarder inlet passage 28. It should also be appreciated that the flow control valve 12 will have been manipulated by fluid pressure in passage 58 to provide the desired flow connections.

When the fluid pressure in passage 28 and the force in spring 322 are sufficient to balance the force created by the pressure in chamber 328, valve 300 will begin to regulate the pressure in passage 28. During pressure regulation, the check valve 88 is disconnected from the accumulator 14 while the check valve 84 is reconnected, thus permitting recharging of the accumulator 14.

The control system discussed above for FIGS. 1, 2 and 3 all provide a function wherein the system pressure is disconnected from the accumulator during the filling of the retarder upon a retardation request. When the retarder pressure is satisfied, each of these systems reestablish a connection between the pressure system or source and the accumulator such that refilling of the accumulator can be achieved. Under this system, repeated retarder on and off manipulations can be achieved without a significant load being placed on the control pump for the transmission.

It has also been found with the system provided by this control, that the response time is significantly reduced in some instances by a factor of 10:1. With the rapid response, the need for frictional regarding is greatly reduced and can be eliminated from the hydraulic retarder assembly, thereby reducing the overall manufacturing expense.

The solenoid valves 234 and 326 are also preferably of the pulse-width-modulated type. However, it should be appreciated that the control system will function equally as well with with hydraulic, pneumatic or mechanical input signals for the pulse valves and the regulator valves.

Obviously, many modifications and variations of the present invention are possible in light of the above teaching. It is therefore understood, that within the scope of the appended claims, the invention may be practiced otherwise than as specifically described.

The embodiments of the invention in which an exclusive property or privilege is claimed are defined as follows:

1. A hydraulic retarder and control comprising: a source of fluid pressure; an accumulator for storing pressurized fluid; first check valve means in fluid communication with said source for directing fluid toward said accumulator; accumulator pulse valve means for selectively directing fluid from said first check valve means to said accumulator and from said accumulator; second check valve means for directing fluid from said accumulator pulse valve means to a hydraulic retarder; pulse control means for holding said accumulator pulse valve means in a position to direct fluid from said accumulator to said second check valve means; and means for supplying fluid to the hydraulic retarder from a secondary source including control means for discontinuing the supply from the secondary source when the pressure at the hydraulic retarder is above a predetermined level.

2. A hydraulic retarder and control comprising: a first source of fluid pressure; an accumulator for storing pressurized fluid; first one-way check valve means in fluid communication with said first source for directing fluid toward said accumulator; accumulator pulse valve means for selectively directing fluid from said first one-way valve means to said accumulator and from said accumulator; second one-way valve means for directing fluid from said accumulator pulse valve means to a hydraulic retarder; pulse control means for holding said accumulator pulse valve means in a position to direct fluid from said accumulator to said second one-way valve means; and means for supplying fluid to the hydraulic retarder from a second source of fluid pressure including control means for controlling the pressure level of the supply from the second source to the hydraulic retarder when the pressure at the hydraulic retarder is at a predetermined level.

3. The invention defined in claim 2 and said pulse control means being operable to direct said accumulator pulse valve means to establish fluid communication between said first source and said accumulator.

4. A hydraulic retarder and control comprising: a source of fluid pressure; an accumulator for storing pressurized fluid; first check valve means in fluid communication with said source for directing fluid toward said accumulator; accumulator pulse valve means having a first position for selectively directing fluid from said first check valve means to said accumulator and from said accumulator; second check valve means for directing fluid from said accumulator pulse valve means to a hydraulic retarder; control means for moving said accumulator pulse valve means in a second position to direct fluid from said accumulator to said second check valve means; and regulator means for supplying fluid to the hydraulic retarder from a secondary source including control means for discontinuing the supply from the secondary source when the pressure at the hydraulic retarder is above a predetermined level.

5. The invention defined in claim 4 wherein said regulator means includes a valve means and wherein the accumulator pulse valve means and said valve means are interconnected and disposed in a single bore.

6. The invention defined in claim 4 wherein said regulator means includes a valve means having a fluid connection with said control means for directing fluid pressure thereto to control the moving of said accumulator pulse valve means.

* * * * *